United States Patent [19]

Kaneko et al.

[11] Patent Number: 4,539,301

[45] Date of Patent: Sep. 3, 1985

[54] GRAPHITE-CONTAINING REFRACTORIES

[75] Inventors: Toshiaki Kaneko; Ichiro Takita; Hiroshi Shikano, all of Kitakyushu, Japan

[73] Assignee: Kurosaki Refractories Co., Ltd., Kitakyushu, Japan

[21] Appl. No.: 586,055

[22] Filed: Mar. 5, 1984

[30] Foreign Application Priority Data

Mar. 12, 1983 [JP] Japan ................................. 58-40963

[51] Int. Cl.$^3$ ............................................. C04B 35/54
[52] U.S. Cl. ..................................................... 501/99
[58] Field of Search ................................... 501/99–101

[56] References Cited

U.S. PATENT DOCUMENTS

| | | | |
|---|---|---|---|
| 4,307,197 | 12/1981 | Daniel et al. | 501/101 |
| 4,387,080 | 6/1983 | Hatta et al. | 501/100 |
| 4,454,239 | 6/1984 | Cassens | 501/100 |

*Primary Examiner*—Helen M. McCarthy
*Assistant Examiner*—Karl E. Group
*Attorney, Agent, or Firm*—James J. Ralabate

[57] ABSTRACT

Thin, flaky graphite-containing refractories are obtained by refining and processing naturally occurring minerals and possess a specific size of the extent of the surface of a flaky layer and a specific thickness of a flake. Such flaky graphite-containing refractories exhibit high endurance and are effective as lining materials particularly for steel making furnaces.

1 Claim, No Drawings

GRAPHITE-CONTAINING REFRACTORIES

BACKGROUND OF THE INVENTION

1. Field of the Invention

The present invention relates to graphite-containing refractories having high endurance.

2. Development of the Invention

Graphite-containing refractories have been employed for many years in various fields including the steel making industry. It is known that graphite-containing refractories are characterized by properties such as high thermal conductivity, high resistance to thermal stress, and resistance to wetting by various molten slag. Recently refractories fabricated by blending graphites with a variety of oxides, nitrides, carbides or the like have been widely employed. A rapid increase has been noted in the use of such refractories particularly for lining the bottom of blast furnaces, torpedo cars and converters and, other major parts such as nozzle stoppers and slide closure devices for flow control, nozzles for a continuous casting process, and the like. Representative examples of the refractories include alumina-graphite, used for a continuous casting nozzles and magnesia-graphite, used as a lining of converters, etc. In the past, materials such as fused silica and the like have been employed but recently alumina-graphite, which has excellent resistance to corrosion, has become the standard. Further, products obtained by duplex simultaneous molding process where a slag line portion is reinforced with zirconia-graphite have come into use. Such refractories exhibit excellent endurance.

However, because the requirements for improving the quality of steel have become severe with the progress in the continuous casting process, excellent endurance has been more strongly desired.

The need for improving the endurance has also involved the latter magnesia-graphite refractories.

In addition, an importance of graphite-containing refractories has recently been increased since it is found that such refractories can be used as the material for introducing gas or powders into molten steel while having the improved resistance to corrosion and improved mechanical properties.

The wear process of these graphite-containing refractories is generally considered as follows: Firstly, the organic binders which as used in blending operation are carbonized to form carbon. Such carbon and graphite present in a refractory blend disappear due to oxidation or dissolution into steel. Accordingly, the structure of the working surface of the lining becomes loose, and is worn out receiving the severe flow of molten steel. Several countermeasures such as reduction of graphite amount, reinforcement of the structure with fine particulation of aggregates and careful selection of graphite raw materials, improvements in resistance to oxidation and resistance to penetration of molten steel, etc. have been worked out. These countermeasures assisted in prolonging the life. However, the improvement is still moderate and therefore less than optimal.

SUMMARY OF THE INVENTION

As a result of investigations using a variety of graphites having different shapes in combination with refractory aggregate powders, it has been discovered that when a specific flaky graphite wherein the size (D) of the flat surface of a layer is not smaller than 0.105 mm, preferably not smaller than 0.21 mm and the thickness (t) is not greater than 20 $\mu$m, preferably not greater than 10 $\mu$m are used, corrosion resistance and spalling resistance are particularly improved. Based on this discovery, the present invention has been accomplished.

An object of the present invention is to provide graphite-containing refractories which improve both corrosion resistance and spalling resistance.

This and other objects of the present invention will be apparent from the following descriptions of this specification.

DETAILED DESCRIPTION OF THE INVENTION

As graphite raw materials, there are flaky graphites, amorphous graphites and the like which naturally occur, and graphites for use of electrodes, Kish graphites and the like which are artificially prepared. From the viewpoints of quality and cost, however, it is advantageous to employ naturally occurring flaky graphites. Naturally occurring graphites are refined generally by repeating the steps of powdering raw ores extracted from mines, sieving the powders and subjecting the sieved powders to ore floatation. Particularly when high purity is required, graphites are prepared by additional subjection to chemical treatments.

The shape of these flaky graphites can be roughly classified and represented by the size of the layered surface and the thickness of the flakes. The shape can be observed by a scanning electron microscope or, particularly in refractory aggregate powders of $Al_2O_3$, $SiO_2$, $ZrO_2$, etc. and graphites, a reflection microscope.

The surface of a layer as used in the specification is defined by using a standard sieve. That is, when graphites are sieved using a standard sieve having a mesh of 0.105 mm, flaky graphites remaining on the sieve are expressed as D≧0.105 mm. The size D can be readily confirmed by using a reflection microscope.

The thickness (t) of the flaky graphites as used in the present invention refers to a numerical value obtained by the following measurement method.

Twenty (20) g of a graphite specimen is mixed with 80 g of fine alumina powders having a size of not greater than 44 $\mu$m using a thermosetting resin. Using an Amsler test molding machine, the mixture is molded under 500 kg/cm$^2$ to provide a briquette of $\phi$ 40 mm $\times$ 15 mm. This briquette is subjected to a hardening treatment at 150° C. for 24 hours and then provided as a specimen. The surface perpendicular to the molding direction is ground and then observed with a reflection microscope. Twenty relatively long graphites are selected from the visual field. The thickness is measured around the center in the longitudinal direction. The average thickness of the intermediate 10 pieces (n=10), eliminating the 5 largest and the 5 smallest, is determined to be the thickness of the flaky graphites.

Referring to the content of the thin, flaky graphites, improved performance is noted when the content of the specfic flaky graphites having a thickness described above is 30 wt % or more based on the total weight of graphites used; with 50 wt % or more, excellent properties are apparent.

Further, it is preferred that the absolute content of the aforesaid flaky graphites having a specific thickness employed relative to the graphite containing-refractories be at least approximately 3 wt %.

Turning next to refractory aggregate powders other than the graphites, raw materials conventionally employed in the refractory industry, such as $Al_2O_3$, $SiO_2$, $ZrO_2$, $MgO$, $Cr_2O_3$, $CaO$, $SiC$, $Si_3N_4$, $BN$, etc., are all usable without any particular restriction. Trace components such as aluminum, silicon, etc. which are added for purposes of imparting physical and chemical strength and preventing oxidation under high temperature, are all usable. With reference to the grain size of aggregate powders, the finer the grain size, the more remarkable is the effect of using the flaky graphites having a thickness in accordance with the present invention.

EXAMPLE 1

Preparation of Graphite Raw Material

Naturally occurring flaky graphites were purified by repeated powdering, sieving and ore floatation to obtain various graphite raw materials. The composition and shape of the thus obtained graphite raw materials are shown in Table 1, wherein A satisfies the requirements of the present invention and, B through E have a thickness exceeding 20 μm and are outside the requirements of the present invention. F satisfies the thickness requirement but has a surface size smaller than that required by the present invention.

Refractory Blend

Alumina was employed as a refractory aggregate and each of graphites shown in Table 1 was blended therein. Examples of the blending are shown in Table 2.

Table 2-1 indicates the case where the total weight of graphites used was 30 wt % based on the total weight of the refractory blend and Table 2-2 indicates the case where the total weight of graphites employed varied from 5 to 70 wt % based on the total weight of the refractory blend. In both tables, A 1, A 7 to A 11, A 13 to A15, A 17 and A 18 are the cases where the thin, flaky graphites specified in the present invention were employed and the remaining are controls.

Preparation of Specimens

Each of the refractory mixtures described above was mixed for 30 minutes using a pan type pouring mixer. The mixture was molded under 900 kg/cm$^2$ using a hydraulic press to produce bricks of normal shape having a size of 230 mm×114 mm×65 mm. After drying at 150° C. for 24 hours, the temperature was elevated at a rate of 20° C./hour under a reducing atmosphere and the bricks were sintered by holding the temperature at 1000° C. for 5 hours.

Test Conditions and Results (1) Spalling Resistance Test

After immersing in molten iron at 1600° C. for 1 minute and 30 second in a high frequency furnace, the specimens were quenched in water for 20 seconds. The procedure was repeated 5 times. By comparing the respective modulus of elasticity $E_0$ $E_5$ ($R=E_5/E_0$) before and after the test, spalling resistance was evaluated. The results are shown in Tables 2-1 and 2-2, penultimate columns. In the tables, evaluation standard S indicates $R \geq 0.95$, A indicates $0.95 > R \geq 0.90$, B indicates $0.90 > R \geq 0.80$ and C indicates $R < 0.80$. As a measure for practical use, the refractories should preferably be better than evaluation standard A, but depending upon conditions for use, refractories up to evalution standard B are usable.

(2) Corrosion Resistance Test

The specimens were used as linings of a high frequency furnace and the material SS 41 (JIS G 3101) was charged therein. After melting SS$_{41}$ at 1600° C. and holding for 60 minutes, the wear rate was determined by measuring the wear rate of the lining to evaluate corrosion resistance. Results are shown in Tables 2-1 and 2-2, bottom column. In the tables, evaluation standard S indicates the case where $L < 105$ wherein L represents a size reduction or wear rate when the case of A 1 is made 100; A indicates $105 \leq L < 110$, B indicates $110 \leq L 120$ and C indicates $L \geq 120$.

From the evaluation standards, it is understood that the refractories made in accordance with the present invention exhibit marked improvements in spalling resistance and corrosion resistance, as compared to the controls.

Practical Use Test

For purpose of comparison, the specimens were employed as open nozzle bricks in a continous casting machine. The period of life for the controls was less than 200 minutes, whereas the period of life for the specimens (5 nozzles) prepared in accordance with the present invention was from about 280 to 350 minutes, thus improving the life by 40 to 75%.

EXAMPLE 2

The present invention was applied to zirconia-graphite refractories and examples thereof are shown in Table 3-1 to 3-2.

Preparation of graphite materials, blending and preparation of specimens were similar to those of Example 1. In the tables, Z 1, Z 3 to Z 5, Z 7 and Z 9 through Z 13 are cases where the thin, flaky graphites specified in the present invention were employed.

Test Conditions and Results

Spalling resistance test was conducted in a manner similar to Example 1.

For testing corrosion resistance, specimens having a size of 20 mm×20 mm×150 mm which were cut out of bricks of normal shape were immersed in a fused mixture of electrolytic iron and slag powders at 1600° C. for 60 minutes using a Cryptol furnace. Evaluation was conducted by Z 1 being made 100 when compared in terms of the size reduction at the maximum wear rate portion; evaluation standard S indicates $L \leq 90$, evaluation standard A indicates $90 < L \leq 110$, evaluation standard B indicates $110 < L 130$ and evaluation standard C indicates $L > 130$.

By the use of Graphite A with a thin thickness according to the present invention, corrosion resistance and spalling resistance were markedly improved. The corrosion resistance was extremely improved with Material Z 5 in which zirconia as an aggregate was employed in the form of fine powders. Lowering of the spalling resistance was also achieved in evaluation standard A.

Practical Use Test

Material Z 5 shown in Table 3-1 was used as a material for powder line portion of an immersing nozzle used in a tundish of 60 tons. The wear rate speed was 0.04 mm/min at one side when conventional Material Z 2 was used, whereas Material Z 5 showed the wear rate speed of 0.02 mm/min, thus exhibiting life improved by twice.

EXAMPLE 3

Flaky graphite prepared in a manner similar to Example 1 was mixed with magnesia to obtain magnesia-graphite bricks. The example is shown in Table 4.

Mixing conditions and molding conditions of specimens were similar to those in Example 1 and specimens of normal shape having a size of 230 mm×114 mm×65 mm were obtained.

All are non-sintered bricks obtained after drying at 200° C. for 24 hours, except M 3. M 3 has the same blending composition as M 1 but was sintered in cokes at 1370° C. followed by an impregnation treatment in pitch. M 1 to M 4 are cases where the thin, flaky graphites specified in the present invention were employed and M 4 to M 6 are controls, particularly M 6 is magnesia-graphite brick conventionally used.

Evaluation Test

Results of bending rupture strength under high temperature, spalling resistance and corrosion resistance of each of the specimens are shown in Table 4, last three columns.

The spalling resistance test was evaluated as follows. Specimens having a size of 50 mm×30 mm×250 mm which were cut out from the aforesaid bricks of normal shape were immersed in molten iron at 1600° C. for 1 minute and 30 seconds in a high frequency furnace and then subjected to a water quenching treatment for 30 seconds. The procedure was repeated 5 times. In a manner similar to Examples 1 and 2, the spalling resistance was evaluated in terms of the comparison of modulus of elasticity ($R=E_5/E_0$) before and after the test.

Further, the specimens were employed as linings for a high frequency furnace and corrosion test was conducted for 4 hours using a molten slag of 1700° C. wherein a $CaO/SiO_2$ ratio was 1.5 and the total Fe was 11.3%. The results are shown in Table 4. The test results are expressed as indices when the wear rate amount of M 6 for comparison was made 100.

M 5 was obtained by simply making the grain construction thereof finer than M 6. While M 5 possesses a preferred property in improving the strength under high temperature, it is apparent that the spalling resistance was seriously lowered and spalling wear would occur in an actual service in the furnace.

To the contrary, M 1 to M 3 in which the graphites in accorance with the present invention were employed show excellent spalling resistance while maintaining high strength under high temperature, so that they possess extremely desirable properties from overall viewpoints.

Practical Use Test

M 2 in accordance with the present invention was employed as a material for a slag line part of a pouring ladle of 300 tons. Conventional material M 6 life of the charge number of 40 times, whereas M 2 showed the charge number of 58 times. Likewise Material M 3 used for a lining wall of a converter of a 150 ton volume. When compared with material M 6 simultaneously lined, a serious convex state was observed. A wear rate calculated from the size after blowing off the furnace was 100 with M 6 whereas material M 3 showed 68.

Total Effects

By specifying the shape of graphite contained in the graphite-containing refractories in accordance with the present invention by the thickness and the surface size, the refractories having improving spalling resistance as well as improved corrosion resistance can be obtained. The refractories can be effectively employed as linings of blast furnaces, torpedo cars, converters, DH furnances, RH furnaces, electric furnaces, furnaces for nonferrous metals, counduits and linings for ladles and, a variety of metallurgical applications such as slide closure devices, gas-introducing bricks, pipes and the like.

While the invention has been described in detail and with reference to specific embodiments thereof, it will be apparent to one skilled in the art that various changes and modifications can be made therein without departing from the spirit and scope thereof.

TABLE 1

| Composition and Shape | Specimen | | | | | |
|---|---|---|---|---|---|---|
| | A | B | C | D | E | F |
| Chemical Composition: | | | | | | |
| Ash content (wt %) | 5.1 | 0.7 | 5.1 | 7.0 | 13.1 | 13.6 |
| Volatile content (wt %) | 0.1 | 3.6 | 1.3 | 2.0 | 2.2 | 2.2 |
| Fixed carbon (wt %) | 94.8 | 95.7 | 93.6 | 91.0 | 84.8 | 84.2 |
| Grain Size (wt %): | | | | | | |
| +0.21 mm | 88 | 100 | 85 | 100 | 92 | 0 |
| 0.21-0.105 | 12 | 0 | 15 | 0 | 8 | 38 |
| -0.105 | 0 | 0 | 0 | 0 | 0 | 62 |
| Thickness of a Flake (μm): | 7 | 21 | 25 | 35 | 45 | 8 |
| Apparent Density (g/cc): (Note 1) | 0.27 | 0.53 | 0.61 | 0.57 | 0.55 | 0.52 |

Note 1:
Measured after charging graphite into a measuring cylinder by the gravity.

TABLE 2

| | Component blended | Specimen | | | | | | | | |
|---|---|---|---|---|---|---|---|---|---|---|
| | | A1 | A2 | A3 | A4 | A5 | A6 | A7 | A8 | A9 |
| Blend Composition (wt %) | Graphite A | 30 | | | | | | 5 | 10 | 20 |
| | B | | 30 | | | | | 25 | 20 | 10 |
| | C | | | 30 | | | | | | |
| | D | | | | 30 | | | | | |
| | E | | | | | 30 | | | | |
| | F | | | | | | 30 | | | |
| | Alumina Particles (mm): | | | | | | | | | |
| | 1-0.074 | 20 | 20 | 20 | 20 | 20 | 20 | 20 | 20 | 20 |
| | 0.074-0 | 50 | 50 | 50 | 50 | 50 | 50 | 50 | 50 | 50 |
| | Thermosetting Resin: | +10 | +10 | +10 | +10 | +10 | +10 | +10 | +10 | +10 |
| Evaluation | Spalling Resistance | S | B | B | B | C | C | A | A | S |
| | Corrosion | S | B | B | C | C | A | B | A | S |

TABLE 2-continued

|  | Resistance Component blended | Specimen | | | | | | | | |
|---|---|---|---|---|---|---|---|---|---|---|
|  |  | A10 | A11 | A12 | A13 | A14 | A15 | A16 | A17 | A18 |
| Blend Composition (wt %) | Graphite A | 20 | 20 |  | 5 | 10 | 20 | 10 | 30 | 50 |
|  | B | 10 | 10 | 5 |  |  |  | 40 | 20 | 20 |
|  | C |  |  |  |  |  |  |  |  |  |
|  | D |  |  |  |  |  |  |  |  |  |
|  | E |  |  |  |  |  |  |  |  |  |
|  | F |  |  |  |  |  |  |  |  |  |
|  | Alumina Particles (mm): |  |  |  |  |  |  |  |  |  |
|  | 1–0.074 | 30 | 40 | 30 | 30 | 25 | 20 | 15 | 15 |  |
|  | 0.074–0 | 40 | 30 | 65 | 65 | 65 | 60 | 35 | 35 | 30 |
|  | Thermosetting Resin: | +10 | +10 | +7 | +8 | +10 | +10 | +15 | +15 | +20 |
| Evaluation | Spalling Resistance | S | S | C | B | A | A | S | S | S |
|  | Corrosion Resistance | A | B | B | S | S | S | C | A | B |

TABLE 3

|  | Component blended | Specimen | | | | | | | | | | | | |
|---|---|---|---|---|---|---|---|---|---|---|---|---|---|---|
|  |  | Z1 | Z2 | Z3 | Z4 | Z5 | Z6 | Z7 | Z8 | Z9 | Z10 | Z11 | Z12 | Z13 |
| Blend Composition (wt %) | Graphite A | 20 |  | 5 | 10 | 20 |  | 3 | 1 | 2 | 3 | 4 | 5 | 10 |
|  | B |  | 20 | 15 | 10 |  | 20 |  | 4 | 3 | 2 | 1 | 0 |  |
|  | Stabilized Zirconia (Note 1): |  |  |  |  |  |  |  |  |  |  |  |  |  |
|  | 0.5–0.074 mm | 30 | 30 | 30 | 30 | 10 | 10 | 30 | 30 | 30 | 30 | 30 | 30 | 30 |
|  | 0.074–0 mm | 10 | 10 | 10 | 10 | 30 | 30 | 15 | 15 | 15 | 15 | 15 | 15 | 15 |
|  | Non-Stabilized Zirconia: |  |  |  |  |  |  |  |  |  |  |  |  |  |
|  | 0.5–0.074 mm | 10 | 10 | 10 | 10 |  |  | 10 | 10 | 10 | 10 | 10 | 10 | 10 |
|  | 0.074–0 mm | 20 | 20 | 20 | 20 | 30 | 30 | 32 | 30 | 30 | 30 | 30 | 30 | 25 |
|  | SiC 0.044–0 mm | 5 | 5 | 5 | 5 | 5 | 5 | 5 | 5 | 5 | 5 | 5 | 5 | 5 |
|  | Silicon 0.074–0 mm | 5 | 5 | 5 | 5 | 5 | 5 | 5 | 5 | 5 | 5 | 5 | 5 | 5 |
|  | Thermosetting Resin: | +7 | +7 | +7 | +7 | +8 | +8 | +5 | +5 | +5 | +5 | +5 | +5 | +6 |
| Evaluation | Spalling Resistance | S | B | A | S | A | C | B | C | B | B | A | A | A |
|  | Corrosion Resistance | A | B | B | A | S | A | S | B | A | S | S | S | S |

Note 1:
Stabilized CaO (Stabilization Degree of 80%) was used.

TABLE 4

|  | Composition blended | Specimen | | | | | |
|---|---|---|---|---|---|---|---|
|  |  | M1 | M2 | M3 | M4 | M5 | M6 |
| Blend Composition (wt %) | Graphite A | 20 | 10 | 20 | 5 |  |  |
|  | B |  | 10 |  | 15 | 20 | 20 |
|  | Sintered Magnesia: |  |  |  |  |  |  |
|  | 5–1 mm |  |  |  |  |  | 45 |
|  | 1–0.074 mm | 52 | 52 | 52 | 52 | 52 | 17 |
|  | 0.074–mm | 25 | 25 | 25 | 25 | 25 | 15 |
|  | Aluminum Powder: 0.074–mm | 3 | 3 | 3 | 3 | 3 | 3 |
|  | Thermosetting Resin: | +4 | +4 | +4 | +4 | +4 | +4 |
| Evaluation | Bending rupture Strength under high temperature (kg/cm²) | 218 | 206 | 298 | 194 | 188 | 108 |
|  | Spalling Resistance | 0.65 | 0.61 | 0.60 | 0.55 | * | 0.59 |
|  | Corrosion Resistance | 93 | 96 | 80 | 98 | 105 | 100 |

*Peeled off after repeating the test 3 times.

What is claimed is:

1. Graphite-containing refractories comprising a refractory aggregate and at least 3 wt % with respect of said aggregate of a thin, flaky graphite raw material wherein at least 30 % by weight of said thin, flaky graphite material has a size of $D \geq 0.105$ mm and $t \leq 10$ μm, wherein D represents the size of the extent of the surface of a flaky layer and t represents the thickness of a flake, said flaky graphite being obtained by refining and processing a naturally occuring mineral.

* * * * *